(12) United States Patent
Franzius et al.

(10) Patent No.: US 10,191,488 B2
(45) Date of Patent: Jan. 29, 2019

(54) AUTONOMOUS VEHICLE WITH IMPROVED SIMULTANEOUS LOCALIZATION AND MAPPING FUNCTION

(71) Applicant: HONDA RESEARCH INSTITUTE EUROPE GMBH, Offenbach/Main (DE)

(72) Inventors: Mathias Franzius, Offenbach (DE); Nils Einecke, Offenbach (DE)

(73) Assignee: NOKIA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/268,752

(22) Filed: Sep. 19, 2016

(65) Prior Publication Data

US 2017/0108867 A1 Apr. 20, 2017

(30) Foreign Application Priority Data

Oct. 15, 2015 (EP) ..................................... 15189928

(51) Int. Cl.
*A01D 34/00* (2006.01)
*G05D 1/02* (2006.01)
*G05D 1/00* (2006.01)

(52) U.S. Cl.
CPC ........... *G05D 1/0088* (2013.01); *G05D 1/027* (2013.01); *G05D 1/0219* (2013.01);
(Continued)

(58) Field of Classification Search
CPC .. G05D 1/0088; G05D 1/0219; G05D 1/0274; G05D 1/027; G05D 1/0251
(Continued)

(56) References Cited

U.S. PATENT DOCUMENTS 8,374,721 B2 * 2/2013 Halloran .................. A47L 5/30
318/568.1
8,761,931 B2 * 6/2014 Halloran .................. A47L 5/30
318/568.12
(Continued)

FOREIGN PATENT DOCUMENTS

EP 2 437 131 A1 4/2012
WO WO 96/038770 A1 12/1996
(Continued)

OTHER PUBLICATIONS

Vector Field SLAM-Localization by Learning the Spatial Variation of Continuous Signals; Jens-Steffen Gutmann; Ethan Eade; Philip Fong; Mario E. Munich; IEEE Transactions on Robotics; Year: 2012, vol. 28, Issue: 3; pp. 650-667, DOI: 10.1109/TRO.2011. 2177691.*
(Continued)

*Primary Examiner* — Cuong H Nguyen
(74) *Attorney, Agent, or Firm* — Squire Patton Boggs (US) LLP

(57) ABSTRACT

An autonomous vehicle comprises an environment sensing means for sensing an environment of the autonomous vehicle, and a computing unit configured to perform a mapping function and a localization function. The mapping function is based upon signals supplied from the environment sensing means to build a map. The localization function localizes the autonomous vehicle within the map and generates localization information. The autonomous vehicle further comprises boundary distance sensing means configured to generate a distance signal correlated to a distance between the autonomous vehicle and boundary indication means. The computing unit is configured to receive the distance signal and to perform the mapping function or the localization function based upon a signal from the environment sensing means and the distance signal from the bound- (Continued)

ary distance sensing means. The system also comprises a boundary wire indicating a border of an area in which autonomous driving of the vehicle can be performed.

11 Claims, 2 Drawing Sheets

(52) U.S. Cl.
CPC ......... *G05D 1/0251* (2013.01); *G05D 1/0265* (2013.01); *G05D 1/0274* (2013.01); *G05D 2201/0208* (2013.01)

(58) Field of Classification Search
USPC .................. 701/25; 700/253; 901/46–47, 50; 356/614
See application file for complete search history.

(56) References Cited

U.S. PATENT DOCUMENTS

| | | | |
|---|---|---|---|
| 8,958,939 B2 | 2/2015 | Einecke et al. | |
| 9,392,920 B2* | 7/2016 | Halloran | A47L 5/30 |
| 9,411,037 B2* | 8/2016 | Jamtgaard | G01S 5/00 |
| 9,603,300 B2* | 3/2017 | Pettersson | A01D 34/008 |
| 2005/0182518 A1 | 8/2005 | Karlsson | |
| 2010/0324731 A1 | 12/2010 | Letsky | |
| 2012/0044355 A1* | 2/2012 | Jamtgaard | G01S 5/00 |
| | | | 348/159 |
| 2012/0083961 A1* | 4/2012 | Sato | G05D 1/0259 |
| | | | 701/25 |
| 2014/0031980 A1* | 1/2014 | Gutmann | G05D 1/0231 |
| | | | 700/253 |
| 2014/0145996 A1* | 5/2014 | Sugita | G06F 3/044 |
| | | | 345/173 |
| 2014/0249671 A1* | 9/2014 | Halloran | A47L 5/30 |
| | | | 700/245 |
| 2015/0316930 A1* | 11/2015 | Karlsson | G01C 21/12 |
| | | | 701/28 |
| 2016/0003972 A1* | 1/2016 | Angermann | G05B 15/02 |
| | | | 702/5 |
| 2016/0026185 A1* | 1/2016 | Smith | G05D 1/0244 |
| | | | 356/614 |

FOREIGN PATENT DOCUMENTS

| | | |
|---|---|---|
| WO | WO 2004/059900 A2 | 7/2004 |
| WO | WO 2014/145996 A1 | 9/2014 |

OTHER PUBLICATIONS

Atmospheric and ocean boundary layer profiling with unmanned air platforms; Mark C. L. Patterson; Drew Osbrink; Anthony Brescia; David Downer; Jim Etro; Joe Cione; 2014 Oceans—St. John's Year: 2014; pp. 1-7, DOI: 10.1109/OCEANS.2014.7002978.*

Path planning algorithm development for autonomous vacuum cleaner robots; Kazi Mahmud Hasan; Abdullah-Al-Nahid; Khondker Jahid Reza; 2014 International Conference on Informatics, Electronics & Vision (ICIEV); Year: 2014; pp. 1-6, DOI: 10.1109/ICIEV.2014.6850799.*

Research & Development Issues Served by a Small Autonomous Test Bed; A. S. Westneat; Proceedings of the 6th International Symposium on Unmanned Untethered Submersible Technology,Year: 1989; pp. 79-87, DOI: 10.1109/UUST.1989.754706.*

Fused robot pose estimation using embedded and external cameras; Kibaek Park; Hyowon Ha; François Rameau; In So Kweon; 2015 12th International Conference on Ubiquitous Robots and Ambient Intelligence (URAI); Year: 2015; pp. 375 376, DOI: 10.1109/URAI.2015.7358913.*

"Vector Field SLAM Localization by Learning the Spatial Variation of Continuous Signals" ; Jens-Steffen Guttmann et al.; Year 2012, vol. 28, Issue 3; pp. 650-667.*

"Fused robot pose estimation using embedded and external camerae"; Kibaek Park et al.; 2015 12th International Conference on Ubiquitous Robots and Ambient Intelligence (URAI); Year: 2015; pp. 375-376.*

"Path planning algorithm development for autonomous vacuum cleaner robots"; Kazi Mamhmud Hasan et al.; 2014 International Conference on Informatics, Electronics & Vision (ICIEV); Year: 2014; pp. 1-6; IEEE Conference Publications.*

"Research Development Issues Serve by a small autonomous Test Bed"; A. S. Westneat; Proceedings of the 6th International Symposium on Unmanned Untethered Submersible Technology,Year: 1989; pp. 79-87;IEEE Conference Publications.*

A new polynomial based SLAM algorithm for a mobile robot in an unknown indoor environment Luigi D'Alfonso; Antonio Grano; Pietro Muraca; Paolo Pugliese 53rd IEEE Conference on Decision and Control; 2014; pp. 5346-5351.*

Multi-Robot Localization and Mapping Strategy: Utilizing Behavior Based Dynamic Tree Structure and Observer-explorer Routine Kevin K. Leung; Garratt Gallagher 2007 IEEE International Conference on Automation Science and Engineering; 2007, pp. 881-886.*

Learning Combinatorial Information from Alignments of Landmarks Luigi Freda; Benjamin Tovar; Steven M. LaValle Proceedings 2007 IEEE International Conference on Robotics and Automation Year: 2007; pp. 4295-4300.*

Efficient path planning in belief space for safe navigation; Robert Schirmer et al.; 2017 IEEE/RSJ International Conference on Intelligent Robots and Systems (IROS); pp. 2857-2863; IEEE Conferences; yeare 2017.*

Vision-based localization and mapping for an autonomous mower; Junho Yang et al.; 2013 IEEE/RSJ International Conference on Intelligent Robots and Systems;Year: 2013; pp. 3655-3662; IEEE Conferences.*

Robust localization system for an autonomous mower; Huiwen Guo et al.; 2015 IEEE International Conference on Robotics and Biomimetics (ROBIO); year 2015; pp. 2580-2584; IEEE Conferences.*

European Search Report dated Jun. 1, 2016 corresponding to European Patent Application No. 15189928.3.

* cited by examiner

AUTONOMOUS VEHICLE WITH IMPROVED SIMULTANEOUS LOCALIZATION AND MAPPING FUNCTION

BACKGROUND

Field

The invention relates to an autonomous vehicle with a computing unit to perform a mapping function and a localization function of the vehicle within the map, in particular an autonomous gardening tool such as an autonomous lawn mower or scarifier and a system with such autonomous vehicle and a boundary wire indicating a border of an area in which autonomous driving of the autonomous vehicle shall be performed.

Description of the Related Art

Over the past few years, it became more and more popular to substitute tools like vacuum cleaners, lawn mowers or scarifier by self-propelled devices that are capable of driving on their own. Thus, no operator is needed that pushes and controls direction of such devices. Of course, the functionality of these devices has been improved over the product cycles up to now. Nevertheless, there are some disadvantages that might be annoying for some users. Maybe the biggest problem is that the driving direction of these devices is determined by chance without knowing anything about the layout of the environment and so the vacuum cleaner or the lawn mower drives around randomly which results inefficiently working on the dedicated area. To improve the devices in that regard, so-called SLAM techniques that are known from the robotic's domain have been introduced also for the autonomous vehicles. SLAM (Simultaneous Localization And Mapping) is the ability to generate a map without human intervention combined with the ability to localize within this map. The self-localization of the autonomous vehicle can be performed even if the process of generating the map is still in progress.

For SLAM typically data from odometry, laser scanners and cameras is used. The problem is that the better the SLAM result shall be, the more expensive the sensors that provide good results are. For example, laser scanners yield good results, but are much more expensive than other sensors. On the other side, odometry and camera data, which would be much cheaper to implement than the laser scanners, can be used for indoor environments without any problem, because they lead to robust SLAM results. But unfortunately, outdoor environments are much more difficult. Thus, in order to provide a vehicle with SLAM-function feasible for outdoor environments also, the SLAM results have to be improved.

Previous proposals for outdoor applications describe different solutions for autonomous vehicles that do not use the SLAM technique. Since also for other, for example camera-based, approaches (obstacle detection) there is a problem that in outdoor environment the lighting conditions may change significantly, U.S. Pat. No. 8,958,939 proposes to adjust the speed of the autonomous vehicle to compensate for varying exposure times for the camera.

Further, US 2010/0324731 describes an interaction between a user and a lawn mower via Smartphone. The mower uses a map that is generated by means of parameter teaching, but of course this means a great effort necessary for the user. Such an effort could be avoided if a robust SLAM technique would be available even for outdoor applications.

But all these approaches cannot compete with SLAM and the opportunities resulting therefrom. Thus, it is an object of the present invention to provide an autonomous vehicle with an improved SLAM capability The problem is solved with the autonomous vehicle and the system including such autonomous vehicle according to the independent claims.

To achieve the object, an autonomous vehicle is suggested that comprises a driving means for self-propelling the autonomous vehicle. The vehicle further comprises at least one environment sensing means for sensing an environment of the vehicle. Such sensing means provides a signal including information perceived to a computing unit that is configured to perform a mapping function and a localization function. The mapping function is performed on the basis of the signal or the signals in case of a plurality of sensors in order to generate or build up a map. With a localization function, localization information on the autonomous vehicle within the map is generated.

SUMMARY

According to the invention, the autonomous vehicle further comprises a boundary distance sensing means. With this boundary distance sensing means, a distance signal is generated that is correlated to a distance between the autonomous vehicle and a boundary indication means. Such boundary indication means can be any indicator that can be recognized by the boundary distance sensing means so that a distance can be derived and indicates an edge or borderline of the area in which the autonomous vehicle shall drive. The computing unit is configured to receive the distance signal in addition to the signals supplied from the at least one environment sensing means and performs at least one of the mapping function and the localization function on the basis of the signals from the at least one sensing means, but also taking into consideration the distance signal from the boundary distance sensing means.

The big advantage is that in particular for outdoor situations it cannot be guaranteed that the signals that are provided from the environment sensing means are sufficiently stable in order to ensure a robust SLAM. Providing the computing unit further with a distance signal which is a very stable and robust signal since a boundary indication means which is dedicated to indicate an edge of an area can always be detected with the same quality give a great improvement for the SLAM result. Thus, there is no variation in the signal according to daytime and season. Such variations of the lighting conditions or the appearance of the environment because of seasonal changes are a big problem for SLAM algorithms that use, for example, data from a camera signal only. The same is true for other environment sensing means, like a bump sensor or an accelerator sensor, because all of these environment sensing means are responsive to changes in the environmental conditions.

Because of the use of the distance signal in addition to the data that is obtained from the environmental sensors the stability and robustness of the SLAM result can be significantly improved. Thus, generally known SLAM algorithms can be used for outdoor applications in particular for gardening tools such as scarifiers or autonomous lawn mowers when the distance signal is used as an observation for the SLAM algorithm.

The system, which makes use of the autonomous vehicle, according to the afore-mentioned features, provides in addition to the autonomous vehicle itself a boundary wire that surrounds the area in which the autonomous vehicle shall be capable of moving around freely.

The use of the distance signal between the autonomous vehicle and such boundary wire has further the advantage that most such systems already make use of a boundary wire for safety reasons. The boundary wire is intended to indicate the edge of a working area of such autonomous vehicle, but up to now no information obtained from the boundary wire has been used for SLAM functions. It was only used to detect that the autonomous vehicle reached the edge of its driving area and then a new direction for the vehicle was set.

In the sub-claims there are defined a plurality of advantageous embodiments and aspects of the autonomous vehicle.

In particular, it is an advantage if the autonomous vehicle is an autonomous gardening device, such as an autonomous lawn mower. For such an autonomous lawn mower or an autonomous scarifier it is in particular important that the SLAM results are robust. In such a case, the information about the map and the localization information including at least information on a current position of the lawn mower can be used to more efficiently mow an area even if this area is of complex layout. Previously the random movement of the mower leads to inefficiently mowing a larger area, because it could not be influenced that some portions of the entire area are mowed a plurality of times whereas others are not mowed at all. Thus, if the SLAM technique is used in an autonomous lawn mower (or in autonomous scarifier or in similar outdoor device) and it can be ensured that the SLAM performs properly even though the environmental conditions may change, a great improvement regarding efficiency can be achieved.

Furthermore, the autonomous vehicle comprises a boundary distance sensing means at least one electromagnetic field sensor. It is particularly advantageous if there is more than one electromagnetic field sensor, because in that case even if the autonomous vehicle does not move, a direction of the autonomous vehicle may be derived from the distance signals obtained by the two electromagnetic field sensors that are arranged on the vehicle distributedly. The use of electromagnetic field sensors has further the advantage that such sensors in many cases are integrated in the autonomous gardening tools anyway and thus, no additional sensors need to be mounted on the autonomous vehicle, but signals that are obtained anyway can be used to improve the SLAM results.

Furthermore, it is an advantage that the electromagnetic field sensors comprise at least one boundary wire sensor and/or a charging station sensor. In addition to the signal that is derived from sensing the electromagnetic field of the boundary wire it is thus possible to receive a signal from a charging station sensor. Contrary to the boundary wire the charging station sensor is associated with a well-known place. It is a signal which is only transmitted from a single point in the entire area whereas the boundary wire surrounds the whole area.

Advantageous sensing means for the autonomous vehicle comprise a bump sensor, a sonar sensor, an accelerometer, a compass sensor, a camera or stereo camera. Of course, any combination of such sensors are possible and particularly it is possible to add further sensors that are available for generating information about the environment of the autonomous vehicle.

According to another aspect of the present invention the autonomous vehicle comprises a control unit for generating control signals for the driving means of the vehicle. Such control signals are used in order to control the driving means to drive the vehicle in a direction and with a speed that is set by the control unit. On the basis of the map that is generated and having the knowledge of at least the position of the autonomous vehicle within the map, the control unit generates control signals that result in driving the autonomous vehicle as direct to the charging station as possible. Previous approaches had the disadvantage that the autonomous vehicle had to drive along the boundary wire until it reached the charging station. But with knowledge of the map that is a representation of the environment of the vehicle and particular the entire area in which the autonomous vehicle can drive, and additionally having the information about the position of the autonomous vehicle within the map, a direct path to the charging station can be realized. Of course, there are limitations to a direct path, for example if some obstacle is within the driving way of the autonomous vehicle. Thus, the "most direct path" does not necessarily mean that it follows a straight line between the current position of the autonomous vehicle towards the charging station, but drives around such obstacles.

It is furthermore advantageous that the computing unit has knowledge about the stay times of the autonomous vehicle for each position that is determined by the localization function. Thus, an analysis can be performed on the stay times of the autonomous vehicle in different segments of an entire environment area that is represented by the map. For example in case that the autonomous vehicle is an autonomous lawn mower, it can be determined which area still needs to be mowed, because the autonomous lawn mower did not yet stay long enough in such a segment of the entire environment.

According to another advantageous aspect, the control unit for generating control signals for the driving means generates the control signals in such a way that the autonomous vehicle is led to areas that had insufficient stay times of the autonomous vehicle up to that point in time. In the example of an autonomous lawn mower this again means that areas for which insufficient mowing times have been recognized can be headed most directly by the autonomous lawn mower. Thus, the mowing result will be improved because equalizing of the mowing times over all the different segments of the entire area can be achieved.

It is furthermore advantageous if the localization information includes both, position information and heading orientation information of the autonomous vehicle. In that case, even if the autonomous vehicle is not in motion, a heading direction can be determined. This means that contrary to known systems it is not necessary that at first the autonomous vehicle drives in an arbitrary direction until it can be recognized that the direction of the vehicle needs to be changed. Even before the driving means is started to operate, the orientation of the autonomous lawn mower or other autonomous vehicle is known. Thus, the first control signal that is provided from the control unit to the driving means may already include an information about a change of the heading orientation of the vehicle.

According to a preferred embodiment the heading position of the autonomous vehicle is derived from signals from the at least two electromagnetic field sensors.

The system includes besides the boundary wire that had already been explained, also a charging station for charging an energy storage of the autonomous vehicle. Furthermore, the charging station is capable of sending a signal that can be detected by the autonomous vehicle as explained above. This signal may deviate in its structure from the signal that is sensed from the boundary wire. Thus, the autonomous vehicle can distinguish between a signal from the boundary wire and the charging station.

BRIEF DESCRIPTION OF THE DRAWINGS

More details and aspects of the present invention will now be described with reference to the annexed drawings. In the drawings there are shown in FIG. 1 is a general structure of an autonomous vehicle in particular an autonomous gardening tool such as an autonomous lawn mower.

DETAILED DESCRIPTION

Figure 1:
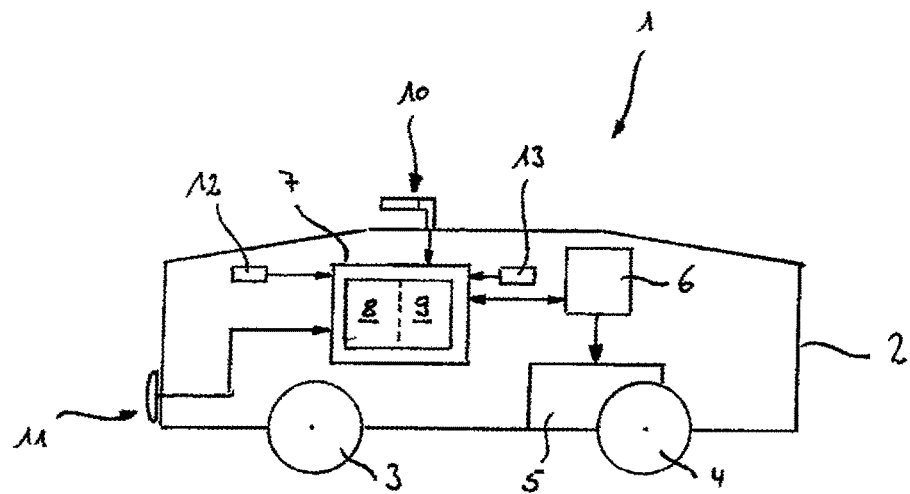

An overview about the structure of an autonomous vehicle which is in the following embodiments an autonomous lawn mower 1 is shown in FIG. 1. The autonomous lawn mower 1 is surrounded by a body work 2 that supports the different units and elements of the autonomous lawn mower 1. In particular, the body work 2 is connected to a plurality of wheels 3 and 4. At least a part of the wheels 3, 4 can be driven by a driving means 5 which in the illustrated embodiment is mechanically connected to wheel 4. In order to control the direction of driving of the autonomous lawn mower 1, the driving means 5 including for example an electric motor is connected to two wheels 4 of a rear axle of the autonomous lawn mower 1. By driving the wheels 4 of the rear axle with different rotational speeds, control of the driving direction of the autonomous lawn mower 1 is possible.

The driving means 5 is controlled by means of signals that are generated by a control unit 6 that is connected to the driving means 5. The control unit 6 generates respective driving signals on the basis of which the driving means 5 set the rotational speed of the wheels 4.

Additionally the inventive autonomous lawn mower 1 comprises a computing unit 7. The computing unit 7 may be either a single central processing unit or may consist of a plurality of means such as a mapping means 8 and a localization means 9. Of course, it is also possible that within the central processing unit all the functions including the mapping function and the localization function which are to be explained later on are executed by the same unit using a common calculation capability.

Several environment sensing means are mounted on the autonomous lawn mower 1. A first environment sensing means can be for example a laser scanner or a camera 10 that is arranged on the top of the vehicle body work 2 in the illustrated embodiment. Furthermore, the bump sensor 11 is provided which feeds its signal that is generated in the bump sensor 11 in response to contact with for example obstacles to the computing unit 7. In the same way, the signal of the camera 10 is supplied to the computing unit 7. Camera 10 and bump sensor 11 are examples for environment sensing means. There may be further environment sensing means provided in the autonomous lawn mower 1 such as, for example, an accelerometer and a compass sensor. Further, the camera might be realized as a stereo camera. Also a sonar sensor may be mounted on the autonomous lawn mower 1. All these different sensors feed their signals which are generated from observing the environment of the autonomous lawn mower 1 to the computing unit 7.

In addition to the environment sensing means, there is provided a first electromagnetic field sensor 12 and a second electromagnetic field sensor 13. The first electromagnetic field sensor 12 and the second electromagnetic field sensor 13 are mounted in a distributed manner on the autonomous lawn mower 1. Thus, by sensing an electromagnetic signal the orientation of the autonomous lawn mower 1 can be calculated from the difference in signal strength of the electromagnetic signal.

According to the present invention, the signals from all of the environment sensing means 10, 11 and furthermore, from the electromagnetic field sensors 12, 13 are fed to the computation means. The first electromagnetic field sensor 12 and the second electromagnetic field sensor 13 form a boundary distance sensing means. First electromagnetic field sensor 12 and the second electromagnetic field sensor 13 each generate a signal that corresponds to the distance between the autonomous lawn mower 1 and a boundary wire as it will be described later on with respect to FIG. 2. This distance signal is then used in a SLAM-algorithm together with the signals and data that is derived from the camera 10 and the bump sensor 11.

According to the illustrated embodiment, the generation of a map from the signals from the environment sensing means 10, 11 and the electromagnetic field sensors 12, 13 is calculated in the mapping means 8. Information about the position and maybe orientation of the autonomous lawn mower 1 within this map is calculated by the localization means 9 on the basis of the signals from the environment sensing means 10, 11 and the electromagnetic field sensors 12, 13. It is evident that the environment sensing means 10, 11 may differ from the illustrated embodiment and also that only one of the electromagnetic field sensors 12, 13 is used. Furthermore, it is to be noted that the signals from the electromagnetic field sensors 12, 13 might be used only in either of the mapping means 8 or the localization means 9. But according to the most advantageous embodiment, the signal from the at least two electromagnetic field sensors 12, 13 as boundary distance sensing means are used in both, the mapping means 8 and the localization means 9. By doing so, it is not only possible to generate information about the position of the autonomous lawn mower 1 within the map, but also the orientation of the autonomous lawn mower 1.

SLAM itself is a well-known technique in robotics. With SLAM simultaneously a map $m_t$ and the robots state $x_t$ (typically position and orientation of the robot) for every time step t is estimated.

In order to do so observations $o_t$ of the environment and a kinematic model $P(x_t|x_{t-1})$ are used.

$$P(x_t|o_{1:t}, m_t) = \sum_{m_t} P(o_t|x_t, m_t) \sum_{x_{t-1}} P(x_t|x_{t-1}) P(x_{t-1}|o_{1:t-1}, m_{t-1})$$

$$P(m_t|o_{1:t}, x_t) = \sum_{m_{t-1}} \sum_{x_t} P(m_t|o_t, m_{t-1}, x_t) P(m_{t-1}, x_t|o_{1:t-1}, m_{t-1})$$

The kinematic model $P(x_t|x_{t-1})$ just describes the transition probabilities that the robot goes from one state $x_{t-1}$ into the next state $x_t$. According to the invention now the observations include also the signals from the electromagnetic field sensors 12, 13.

As it is indicated with a bidirectional arrow between the computing means 7 and the control unit 6 also an information derived from the drive means 5 can be used as an observation. This is what is usually done for robot movements that use rate encoders at the wheels. Alternatives are IMU's or visual ego-motion estimation.

Recent approaches in many cases used cameras in particular for outdoor applications, because in outdoor environment there is the problem that the wide open fields that are to be observed reduce the suitability of simple range and tactile sensors. Use of tactile sensors would lead to no change for a long distance of movement of the autonomous vehicle and thus no information can be derived from such sensor data. But as mentioned earlier, use of a camera in order to receive information even from objections near the horizon has the drawback that the data that is recorded by the camera changes quite drastically and rapidly over time. For example, the illumination from the sun changes rapidly over the course of a day and the appearance of the environment changes drastically of the course of the seasons.

As the present invention now uses also the signal from at least one electromagnetic field sensor or another type of sensor that is capable of determining a signal correlated with the distance of the autonomous lawn mower 1 from a boundary indicator that extends along an edge of the area of which the map shall be generated, a stable signal is also taken into consideration when generating the map or localizing the autonomous lawn mower. The preferred embodiment of an autonomous lawn mower uses the signal strength of a boundary wire signal that surrounds the area of which the map shall be generated. Such a boundary wire is usually present anyway for autonomous lawn mowing systems and it provides an additional observation for localization and mapping. Due to the stability of the wire strength measurement a great improvement with respect to the SLAM algorithm is achieved with nearly no extra costs.

Figure 2:
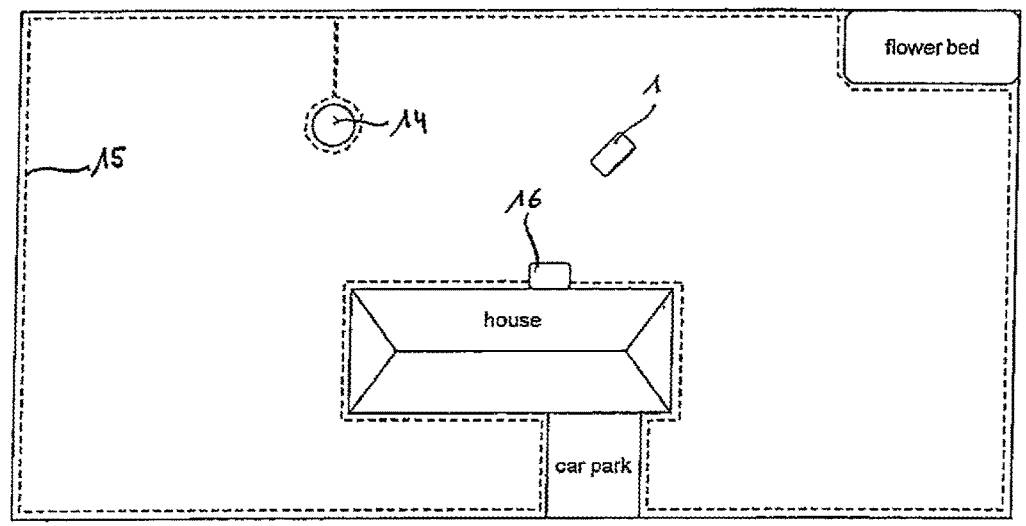
FIG. 2 is an example for a system according to the present invention with an autonomous lawn mower, a boundary wire and a charging station in an exemplary environmental situation and illustrating the advantage of using a signal derived from sensing the electromagnetic field of the boundary wire in the SLAM algorithm.

An example to explain the inventive approach is given in FIG. 2. The situation will be explained on the basis of a top view of a garden with a relatively large area of grass which is interrupted only by a house, a carpark, a flower bed and a tree. The dashed line extends along the edge and surrounds the lawn which is to be mowed by the autonomous lawn mower 1. The autonomous lawn mower 1 in the situation depicted in FIG. 2 is at an arbitrary position on the lawn. Additionally and near the house, there is present a charging station 15 where the autonomous lawn mower 1 needs to be driven to at the end of the mowing process in order to be recharged.

The boundary wire 15 which surrounds the working area of the autonomous lawn mower 1 emits a weak electromagnetic signal. This electromagnetic signal can be sensed by the electronic field sensors 12, 13. The computing means 7 now can infer from the signal whether the autonomous lawn mower is inside or outside the area defined by the wire. Furthermore and based on the signal strength of the received electromagnetic signal it can be calculated how close the autonomous lawn mower 1 is to the wire. This information is usually used in order to trigger a turning maneuver when the autonomous lawn mower 1 has reached the boundary wire. The wire strength is only a one-dimensional signal that correlates with the distance to the wire. Nevertheless it strongly improves the localization and mapping estimation due to its stability.

Figure 3:
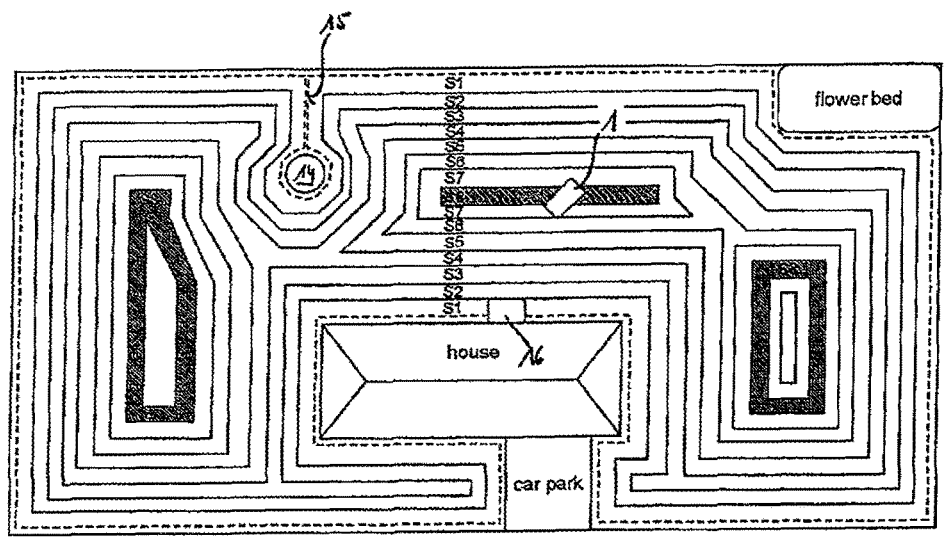
FIG. 3 is a further schematic for explaining the advantages of the inventive approach.

FIG. 3 explains this by showing areas or zones of equal signal strength. In the present case eight levels S1 to S8 are used for illustrational reasons only. Thus, if the autonomous lawn mower 1 on the basis of the signals generated by the electromagnetic field sensors 12, 13 recognizes that the received signal strength corresponds to the level indicated in the drawing as S8, only a few possible locations remain where the autonomous lawn mower 1 currently can be. Only the striped areas in FIG. 3 correspond to the signal strength of S8. It is to be noted that the eight signal levels S1 to S8 are only used for illustration reasons and of course the suggested linear change in the strength of the wire signal is not necessarily the case. Of course, when the map is built up, the actual distribution of the electromagnetic field strength is automatically learned. Within a known map the information localization can be greatly improved. Thus, the signal strength that corresponds to a distance signal generated by the electromagnetic field sensors 12, 13 can be used when generating the map but also when localizing the autonomous lawn mower 1 within the generated map. In SLAM algorithms the wire signal information in the map might be fixed after some time of learning because a change in the signal is not expected. In contrast the learning and adaptation of the other sensor environment data might continue as these might change.

Of the other sensor environment data might continue as these might change. Thus, the wire signal serves as a stable reference and leads to a stabilization of the map even if a map update is performed for other observed parameters which are perceived by the environment sensing means.

As already explained with respect to FIG. 1, the illustrated autonomous lawn mower 1 comprises a plurality of electromagnetic field sensors 12, 13, at least two sensors 12, 13. Thus, because of the difference of the received signal strength, the orientation of the autonomous lawn mower 1 may be derived. The localization information that is generated by the localization means 9 thus includes not only information on the position of the autonomous lawn mower 1 in the map, but also on its orientation.

In addition to the electromagnetic signal transmitted by the boundary wire, possibly the autonomous mower can recognize the charging station when the autonomous lawn mower 1 is within the vicinity of the charging station. This additional information which also delivers some information about a particular area in which the autonomous lawn mower 1 currently can only be, is also used to improve mapping and localization, but offers also an extra means for tackling the loop closure problem. The loop closure problem per se in SLAM is already known and is the problem of recognizing that a place has already been visited. Closing the loop is necessary so that the driven track of the autonomous lawn mower 1 for which the map has been generated by associating information about the environment with a particular position of the autonomous lawn mower 1. Only by closing the loop, the generated map information gets aligned correctly.

An autonomous lawn mower in general can use SLAM in two different ways. On the one hand side, the mapping and localization could be performed in separate steps in such a way that after a training phase that is used to generate the map, the map information is fixed. After such a training phase then only localization of the autonomous lawn mower 1 is performed. On the other side, it is also possible to continuously generate the map which means that using all the information gathered while driving with the autonomous lawn mower 1 in the area limited by the boundary wire is used to improve the currently existing map.

Whereas in the first approach, the learned map can be checked by an operator for errors and misinterpretations with the second approach it is possible to always have an actual map. Thus, changes in the garden layout, for example, new plants, are always reflected in the current map. By using the distance signal generated from the received boundary wire signal in the SLAM algorithm according to the present invention, it is avoided that the map becomes unstable due to many small changes like placing or relocating of chairs or the like. The electromagnetic field that is present at a particular place within the map does not change after an initial learning phase and thus can act as a stable reference for later adaptation of the map for other sensor data.

As with the present invention the use of SLAM technique in outdoor applications or other environments of autonomous vehicles where the environmental conditions change rapidly, a more intelligent behavior of the autonomous vehicle is possible. To stick to the example of an autonomous lawn mower 1 it is, for example, possible to more directly head towards the charging station 16 at the end of a mowing session. In the map, the position of the charging station 16 is known and furthermore, the position of the autonomous lawn mower 1 within the map is known. Thus, a direct driving path can be calculated by the computing unit 7 and the respective information about a necessary driving direction can be forwarded to the control unit 6. The control unit 6 then generates a control signal for driving the driving means 5. Of course, the calculation of the direction may also include a way driving around an obstacle that is between the autonomous lawn mower 1 and the charging station 16.

Figure 4:
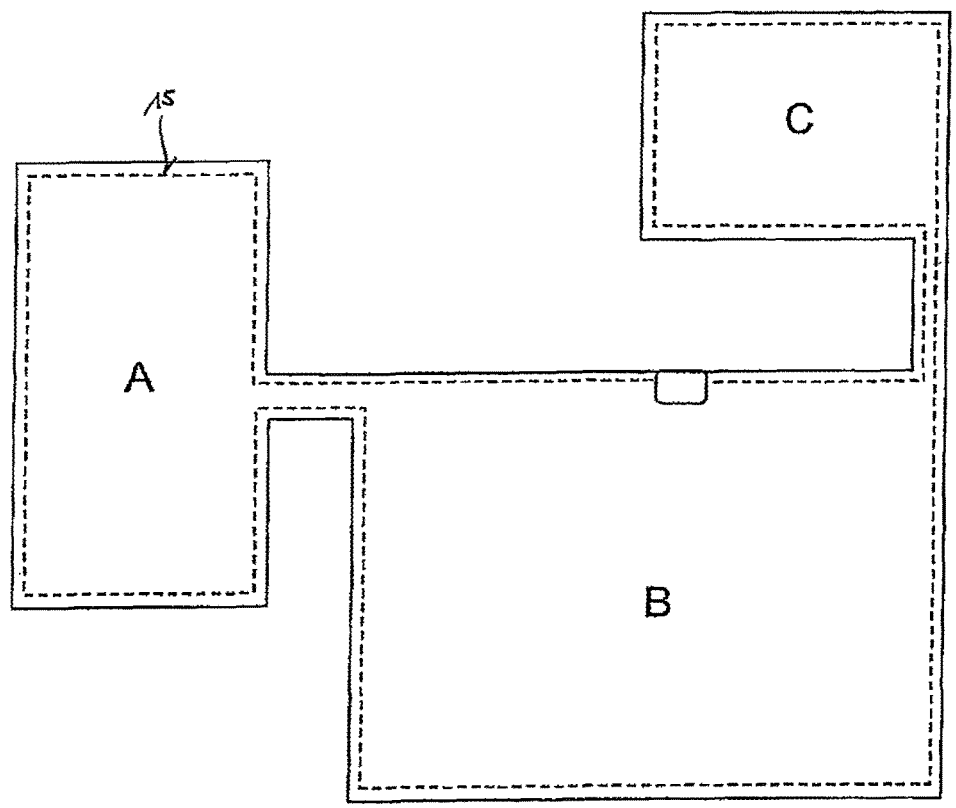
FIG. 4 is an example illustrating an entire area in which an autonomous vehicle can drive consisting of a plurality of segments.

Another aspect is improvement of efficiency in a more complex layout of a lawn as it is shown in FIG. 4. In FIG. 4, the entire area consists of three segments A, B and C. Previously, control algorithms for autonomous lawn mowers relied on the randomly chosen driving directions only. As according to the new approach with the SLAM technique, a map of the entire area is generated the autonomous lawn mower 1 can be controlled to directly drive from segment B where the charging station 16 is located to segment A or segment C.

In order to achieve that all the segments A, B and C show corresponding mowing times in the computing means 7, the stay times of the autonomous lawn mower 1 within each segment A, B or C are stored. Thus, from the localization information that is stored within the computation means 7 it can be analyzed if the mowing time in segment A, segment B or segment C corresponds to the size of the respective segment properly. Thus, if the random drive of autonomous lawn mower leads to sufficient mowing time in segment B, but no or insufficient mowing time in segment A a path can be calculated to intentionally drive the lawn mower 1 from segment B to segment A. In a similar way the lawn mower can be brought to segment C. Such intentional movement of the autonomous lawn mower 1 can be used for example in addition to the random drive of the lawn mower during the process of mowing.

The invention claimed is:

1. An autonomous vehicle, comprising:
    driving means,
    at least one environment sensing means for sensing an environment of the autonomous vehicle, and
    a computing unit configured to perform a mapping function on the basis of a sensor signal supplied from the at least one environment sensing means to build up a map and a localization function configured to localize the autonomous vehicle within the map and generate respective localization information,
    the autonomous vehicle further comprising a boundary wire sensor configured to generate a distance signal based on a determined signal strength of a boundary wire signal received from a boundary wire, wherein the distance signal is correlated to a distance between the autonomous vehicle and the boundary wire,
    wherein the computing unit is configured to receive the distance signal, to perform the mapping function on the basis of the sensor signal and the distance signal by setting the distance signal as a stable reference when a map update is performed by the computing unit on the basis of the sensor signal, and to perform the localization function on the basis of the sensor signal and the determined signal strength by assigning the determined signal strength to one of areas or zones of equal signal strength within the map.

2. The autonomous vehicle according to claim 1, wherein the autonomous vehicle is an autonomous gardening device, in particular a lawn mower.

3. A system comprising:
    an autonomous vehicle according to claim 1, and
    the boundary wire indicating a border of an entire area in which autonomous driving of the autonomous vehicle shall be performed.

4. The autonomous vehicle according to claim 1, wherein the autonomous vehicle further comprises a charging station sensor, which is an electromagnetic field sensor.

5. The autonomous vehicle according to claim 1, wherein the at least one environment sensing means comprises a bump sensor, a sonar sensor, an accelerometer, a compass sensor, a camera, or a stereo camera.

6. The autonomous vehicle according to claim 1, wherein the autonomous vehicle comprises a control unit for generating control signals for the driving means,
    wherein the control unit is configured to generate the control signals on the basis of the map and the localization information such that the autonomous vehicle follows the most direct path that the autonomous vehicle is able to follow towards a charging station for the autonomous vehicle.

7. The autonomous vehicle according to claim 1, wherein the computing unit is configured to analyze how long the autonomous vehicle stays in different segments of an entire environment area represented by the map.

8. The autonomous vehicle according to claim 7, wherein the autonomous vehicle comprises a control unit for generating control signals for the driving means,
    wherein the control unit is configured to generate the control signals on the basis of the map, the localization information, and the analysis result such that the autonomous vehicle follows the most direct path that the autonomous vehicle is able to follow towards a segment for which insufficient stay times are recognized.

9. The autonomous vehicle according to claim 1, wherein the localization information includes position information and heading orientation information.

10. The autonomous vehicle according to claim 9, wherein
    the computing unit is configured to estimate the heading position on the basis of signals from at least two electromagnetic field sensors.

11. The system according to claim 3, wherein
    the system further comprises a charging station for charging an energy storage of the autonomous vehicle.

* * * * *

UNITED STATES PATENT AND TRADEMARK OFFICE
CERTIFICATE OF CORRECTION

PATENT NO. : 10,191,488 B2
APPLICATION NO. : 15/268752
DATED : January 29, 2019
INVENTOR(S) : Mathias Franzius et al.

Page 1 of 1

It is certified that error appears in the above-identified patent and that said Letters Patent is hereby corrected as shown below:

On the Title Page

Item (73):
Please change the Assignee's name from "NOKIA RESEARCH INSTITUTE EUROPE GMBH" to --HONDA RESEARCH INSTITUTE EUROPE GMBH--

Signed and Sealed this
Ninth Day of September, 2025

Coke Morgan Stewart
*Acting Director of the United States Patent and Trademark Office*